Nov. 18, 1969
C. R. MORELOCK
3,479,205
PROCESS FOR PRODUCING BORON FILAMENT
Filed Oct. 14, 1966
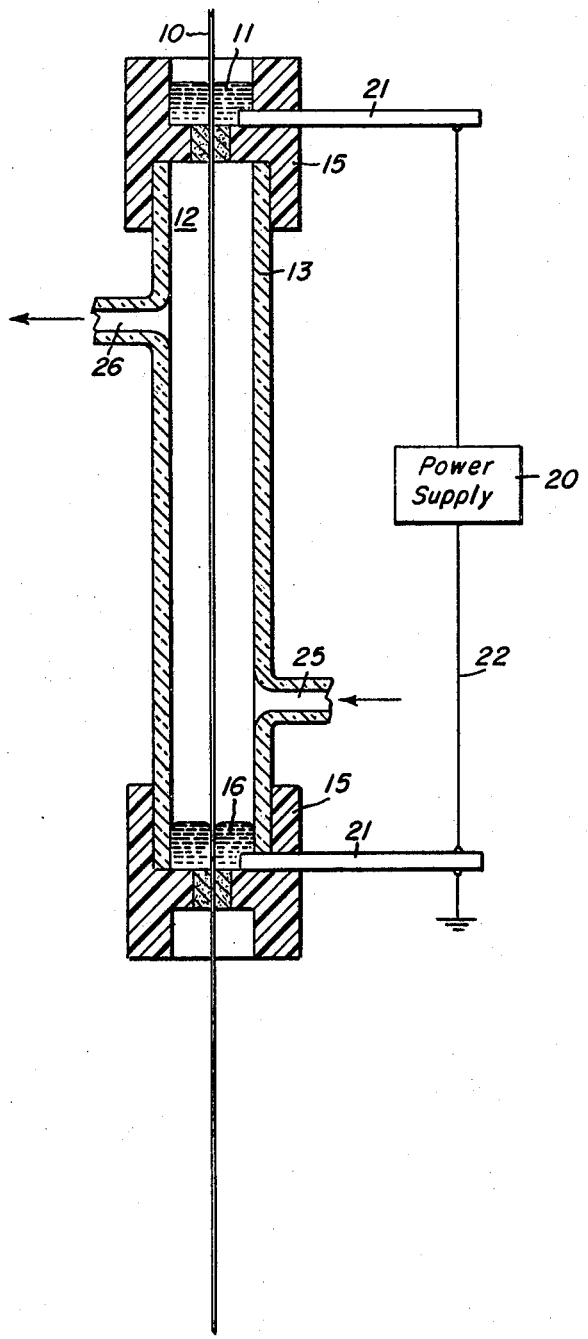
Inventor:
Charles R. Morelock,
by Richard G. Speer
His Attorney.

United States Patent Office 3,479,205
Patented Nov. 18, 1969

3,479,205
PROCESS FOR PRODUCING BORON FILAMENT
Charles R. Morelock, Ballston Spa, N.Y., assignor to General Electric Company, a corporation of New York
Filed Oct. 14, 1966, Ser. No. 586,809
Int. Cl. C23c 9/06; B44c 1/02
U.S. Cl. 117—46                                           1 Claim

ABSTRACT OF THE DISCLOSURE

A process is disclosed for the continuous coating of boron by the thermal decomposition of boron trichloride on the surface of a continuous filament of pyrolytic carbon coated fused filament. In order to be able to ohmically heat the filament to a temperature at which the boron trichloride is efficiently decomposed, the thickness of the pyrolytic graphite coating is increased by thermally decomposing acetylene diluted with nitrogen by ohmic heating, thereby increasing the current carrying capacity of the filament.

---

This invention relates to continuous filaments and more particularly to a method for producing continuous filaments of boron on a fused silica fiber base having an electrically conductive pyrolytic carbon coating.

In recent years, increased demands have been made for the development of materials exhibiting superior mechanical and/or chemical properties. One line of development involves the use of fibers or filaments in various matrix materials (metals, plastics, etc.) to improve strength, abrasion resistance, thermal stability, etc. One filament of particular use is a boron filament formed by coating a tungsten wire with boron metal. However, this filament is comparatively costly to produce and is somewhat limited in the sizes in which it can be manufactured.

It is a principal object of this invention to provide a process for more economically and simply producing continuous boron filaments than has been possible previously.

Another object of this invention is to provide a process for depositing boron on a continuous filament of pyrolytic carbon coated fused silica.

An additional object of this invention is to provide a process for depositing boron, through the decomposition of boron trichloride onto a continuous pyrolytic carbon coated fused silica fiber.

Other objects and advantages of this invention will be in part obvious and in part explained by reference to the accompanying specification and drawings.

The figure of the drawings is a cross-sectional view through an apparatus for carrying out the process of this invention.

Broadly, the present process comprises passing a continuous filament of pyrolytic carbon-coated fused silica into a reaction chamber which contains a thermally dissociable carbonaceous atmosphere. During the time the filament is located within the reaction chamber, the pyrolytic carbon coating is connected to a source of electricity so that current can be passed through it. With the passage of current through the coating located within the reaction chamber, resistive heating occurs and the carbonaceous gas dissociates resulting in the deposit of additional pyrolytic carbon on the surface of the filament. The filament is next passed through a reaction chamber which contains boron trichloride as part of the operating atmosphere. Again, an electric current is passed through the pyrolytic carbon coating on the surface of the fused silica filament and sufficient current is used to insure that a filament temperature of at least 1000° C., and preferably around 1200° C., is obtained. This comparatively high filament temperature is sufficient to cause thermal dissociation of boron trichloride and the consequent deposition of boron metal on the surface of the carbon.

Referring to the drawings, to explain the process in more detail, a continuous filament 10 of fused silica having a coating of pyrolytic carbon is fed down through a mercury pool 11 into a reaction chamber 12 defined by vessel 13. These filaments are normally very small, for example on the order of 0.7 mil in diameter, including the pyrolytic carbon coating. The mercury pool 11 which serves as an electric contact, is contained within an appropriate end seal 15 mounted on each end of the reaction vessel 13. The filament passes downwardly through the reaction chamber 12 and through a second mercury pool 16 which also serves as an electrical contact. The use of liquid mercury as a contact material with the carbon coating on the surface of filament 10 eliminates the possibility of breaking the very fragile filament and assures that no electric arcing or overheating can occur which would burn the filament in two. Electricity is supplied to the mercury from power supply 20 and the appropriate electrodes 21 that are connected to the power supply by wires 22.

Controlled atmosphere can be fed to the reaction chamber 12 of vessel 13 by means of the inlet orifice 25 and the exit orifice 26. In operation, the filament 10 which already contains a coating of pyrolytic carbon can be passed into the reaction chamber 12 so that portion of the filament located within the reaction chamber is connected to a source of electric current. By energizing the power supply 20, current flows through the carbon coating on the filament 10 and resistively heats it to a temperature causing thermal dissociation of the surrounding carbonaceous gas and the deposition of additional pyrolytic carbon on the filament. Since the filament is traveling continuously through the reaction chamber, there is, of course, a continuous deposition on the filament throughout its time of travel through chamber 12. Upon exiting from the bottom of the apparatus, the filament containing the additional pyrolytic carbon can either be wound onto a spool or can be passed into a second apparatus, identical to that described, for the deposition of a boron coating. If the material is spooled for recycling through the same apparatus, then the atmosphere flowing into the reaction chamber 12 need only be changed from a carbonaceous one to one containing boron trichloride.

The filament 10 can be passed through the reaction chamber 12 as often as necessary to further increase the thickness of the deposited pyrolytic carbon coating. Once an adequate coating has been laid down, the material is passed into a reaction chamber with an atmosphere containing boron trichloride ($BCl_3$) and sufficient electric current passed through the deposited carbon coating that the filament is resistively heated to a point that its surface reaches at least 1000° C. At this temperature, dissociation of boron trichloride can occur in a hydrogen carrier with the deposition of boron metal on the surface of the previously deposited carbon. The boron trichloride is usually combined with hydrogen which together with the heat acts to reduce the $BCl_3$ so that deposition of boron metal can be effected.

As an example of the present process, a pyrolytic carbon coated quartz filament was threaded through a unit constructed along the lines of that shown in the drawing with the electric contact being made by the mercury seals. $C_2H_2$ gas and nitrogen were then passed into the reaction chamber while the filament was continuously fed through the chamber from a spool at a stress of about 30,000 p.s.i. applied by a weight attached to the lower end of the filament. Approximately two milliamps DC were then passed through the carbon coating on the filament which resulted in the heating of the filament to about 1000° C. Once carbon deposition began, by the pyrolysis of the $C_2H_2$ gas, the voltage was lowered until the current could be established at approximately three milliamps. The travel speed was approximately six inches per minute and additional coatings were applied by rewinding the filament onto the spool and running it through the reaction chamber a second time at higher current densities. The carbon coating on the filament was increased by a factor of four in one pass at 3 milliamps. This filament was then passed through the reaction chamber which this time contained a boron trichloride-hydrogen mixture. The power was increased until boron deposition began and then stabilized at about 8 milliamps so that boron deposition would continue. It was thus established that an additional carbon layer will permit pyrolytic carbon-coated fused silica filament to be used as a filament material in a $BCl_3$—$H_2$ reaction chamber.

What I claim as new and desire to secure by Letters Patent of the United States is:

1. A process for depositing boron on a pyrolytic carbon coated fused silica continuous filament comprising, passing the filament under tension through a reaction chamber containing an atmosphere of acetylene diluted with nitrogen, passing an electric current through that portion of the pyrolytic carbon coating located within the reaction chamber to resistively heat the coating to about 1000° C. to thermally dissociate the acetylene and deposit additional pyrolytic carbon on the filament, passing the thus coated filament under tension through a reaction chamber containing an atmosphere of boron trichloride and hydrogen, and passing an electric current through that portion of the pyrolytic carbon coating located within the reaction chamber to resistively heat the coating to a temperature of about 1200° C. to thermally dissociate the boron trichloride and deposit a continuous coating of elemental boron over the pyrolytic carbon coating.

References Cited

UNITED STATES PATENTS

| | | | |
|---|---|---|---|
| 3,125,428 | 3/1964 | Maczka | 65—3 |
| 3,130,073 | 4/1964 | Vander Linden et al. | |
| 3,177,094 | 4/1965 | Dijksterhuis et al. | |
| 3,365,330 | 1/1968 | Hough | 117—201 |

ANDREW G. GOLIAN, Primary Examiner

U.S. Cl. X.R.

117—69, 93, 106, 121, 123